US012570150B2

(12) United States Patent
Wu et al.

(10) Patent No.: US 12,570,150 B2
(45) Date of Patent: Mar. 10, 2026

(54) POWER DISTRIBUTION DEVICE AND TRANSPORTATION DEVICE HAVING POWER DISTRIBUTION DEVICE

(71) Applicant: BYD COMPANY LIMITED, Shenzhen (CN)

(72) Inventors: Zhenhan Wu, Shenzhen (CN); Zhi Zeng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 150 days.

(21) Appl. No.: 18/522,015

(22) Filed: Nov. 28, 2023

(65) Prior Publication Data

US 2024/0092174 A1     Mar. 21, 2024

Related U.S. Application Data

(63) Continuation of application No. PCT/CN2022/101449, filed on Jun. 27, 2022.

(30) Foreign Application Priority Data

Aug. 2, 2021     (CN) ........................ 202121785979.X

(51) Int. Cl.
*B60L 1/00* (2006.01)
*H01B 1/18* (2006.01)
(Continued)

(52) U.S. Cl.
CPC .................. *B60L 1/00* (2013.01); *H02B 1/20* (2013.01); *H02B 1/26* (2013.01); *H02J 7/345* (2013.01)

(58) Field of Classification Search
CPC ..... B60L 1/00; H02B 1/20; H02B 1/26; H02J 7/345
(Continued)

(56) References Cited

U.S. PATENT DOCUMENTS

2002/0064976 A1     5/2002   Saito et al.
2019/0229377 A1*    7/2019   Kim ........................ B60L 50/64

FOREIGN PATENT DOCUMENTS

CN          205724734 U      11/2016
CN          207339342 U      5/2018
(Continued)

OTHER PUBLICATIONS

The World Intellectual Property Organization (WIPO) International Search Report for PCT/CN2022/101449 Sep. 20, 2022 6 Pages.

*Primary Examiner* — Rexford N Barnie
*Assistant Examiner* — Swarna N Chowdhuri
(74) *Attorney, Agent, or Firm* — Wenye Tan

(57) ABSTRACT

A power distribution device and a transportation device having the power distribution device are provided. The power distribution device includes a housing, a pre-charging circuit module, and a main positive circuit module. The housing has a mounting cavity. The pre-charging circuit module is configured to pre-charge a capacitor element in an electrical appliance, and includes a pre-charging relay. The pre-charging relay is connected with the housing. The main positive circuit module is configured to be closed after the pre-charging circuit module is opened. The main positive circuit module and the pre-charging circuit module are stacked in the mounting cavity in an up-down direction. The main positive circuit module includes a fuse and a main relay core. The main relay core is connected with the housing.

18 Claims, 4 Drawing Sheets

(51) Int. Cl.
    *H02B 1/20*           (2006.01)
    *H02B 1/26*           (2006.01)
    *H02J 7/34*           (2006.01)

(58) Field of Classification Search
    USPC ........................................................ 307/10.1
    See application file for complete search history.

(56)                References Cited

FOREIGN PATENT DOCUMENTS

| | | | |
|---|---|---|---|
| CN | 209150758 U | | 7/2019 |
| CN | 210792802 U | * | 6/2020 |
| CN | 211195876 U | | 8/2020 |
| CN | 211208906 U | | 8/2020 |
| CN | 211859635 U | | 11/2020 |
| CN | 212380731 U | | 1/2021 |
| CN | 215772569 U | | 2/2022 |
| JP | 2020074279 A | | 5/2020 |

* cited by examiner

POWER DISTRIBUTION DEVICE AND TRANSPORTATION DEVICE HAVING POWER DISTRIBUTION DEVICE

CROSS-REFERENCE TO RELATED APPLICATIONS

The present application is a continuation application of PCT application No. PCT/CN2022/101449, filed on Jun. 27, 2022, which claims priority to Chinese Patent Application No. CN202121785979.X, filed on Aug. 2, 2021 and entitled "POWER DISTRIBUTION DEVICE AND TRANSPORTATION DEVICE HAVING POWER DISTRIBUTION DEVICE". The entire content of all of the above-referenced applications is incorporated herein by reference.

FIELD

The present disclosure relates to the field of power distribution device technologies and transportation device technologies, and more specifically, to a power distribution device and a transportation device having the power distribution device.

BACKGROUND

In transportation devices, such as electric vehicles, electric ships, electric rail transit, and airplanes, power distribution devices are widely used. A power distribution device is mainly composed of a main relay, a pre-charging relay, an aluminum shell resistor, and a resistance wire which are tied and fixed by using cable ties and snaps. Although the power distribution device composed in the above way is simple to operate and convenient to maintain, as a modular product, the power distribution device has insufficient product attributes of parts. On the one hand, the product integration is low, and the overall dimension structure is rather large. The main reason is that components in the module are still independent individuals, and are only spliced together by simple methods such as bolts and snaps, and the wiring harness is fixed by cable ties. Therefore, the product integration is low. Moreover, internal components are tiled, and the utilization rate of internal space is not high. Therefore, the overall dimension structure is rather large. On the other hand, the product cost is high, because each component is designed as a separate product without association with each other, which leads to an increase in cost.

SUMMARY

The present disclosure is intended to solve at least one of the above technical problems, and provides a power distribution device and a transportation device having the power distribution device, which leads to a high internal space utilization rate and a relatively low cost.

According to an aspect, an embodiment of the present disclosure provides a power distribution device. The power distribution device includes a housing, a pre-charging circuit module, and a main positive circuit module. The housing has a mounting cavity. The pre-charging circuit module is configured to pre-charge a capacitor element in an electrical appliance, and includes a pre-charging relay. The pre-charging relay is connected with the housing. The main positive circuit module is configured to be closed after the pre-charging circuit module is opened, and the main positive circuit module and the pre-charging circuit module are stacked in the mounting cavity in an up-down direction. The main positive circuit module includes a fuse and a main relay core. The main relay core is connected with the housing. The power distribution device has an input terminal and a first output terminal. A first end of the fuse is the input terminal or connected with the input terminal, and a second end of the fuse is connected with a first end of the main relay core. A second end of the main relay core is the first output terminal or connected with the first output terminal. A first end of the pre-charging circuit module is connected with the input terminal or the second end of the fuse, and a second end of the pre-charging circuit module is connected with the second end of the main relay core or the first output terminal.

According to another aspect, an embodiment of the present disclosure further provides a transportation device. The transportation device is provided with the power distribution device, an electric energy storage element, and an electrical appliance. The power distribution device is connected between the electric energy storage element and the electrical appliance, and is configured for connection and disconnection between an electric module and the electrical appliance.

According to the power distribution device and the transportation device having the power distribution device, structures of various components in the power distribution device are cooperatively and interactively designed, and the main positive circuit module and the pre-charging circuit module are arranged on the housing in a local or overall stacking mode. In this way, the utilization rate of the internal space of the power distribution device is high, and the components do not affect each other, so that the damaged components can be replaced independently, which is beneficial to improving the product qualification rate and reducing the after-sales loss of the products, and the application cost is low.

BRIEF DESCRIPTION OF THE DRAWINGS

To describe the technical solutions in the embodiments of the present disclosure more clearly, the following briefly describes the accompanying drawings for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure more apparent and clearer, the following describes the present disclosure in further detail with reference to the accompanying drawings and embodiments. It should be understood that, the specific embodiments described herein are merely used for explaining the present disclosure rather than being used for limiting the present disclosure.

It should be noted that, terms "arrangement" and "connection" should be broadly understood, for example, which may be direct arrangement and connection, or indirect arrangement and connection through a central component or a central structure.

In addition, in the embodiments of the present disclosure, orientation or position relationships indicated by the terms such as "longitudinal", "transverse", "length", "width", "thickness", "on", "below", "front", "back", "left", "right", "vertical", "horizontal", "top", "bottom", "inside", and "outside" are based on the orientation or positional relationship shown in the accompanying drawings or the conventional placing state or use state, which are only for the convenience of describing the present disclosure and simplifying the description, and does not indicate or imply that the referred structure, feature, device, or element should have a specific orientation or positional relationship, nor should it be constructed and operated in a specific orientation. Therefore, such terms should not be construed as a limitation on the present disclosure. In the description of the present disclosure, unless stated otherwise, the meaning of "multiple" is two or more than two.

Various specific technical features and embodiments described in the foregoing specific implementations may be combined in any proper manner in the case of no contradiction. For example, different implementations may be formed through the combination of different specific technical features/embodiments. In order to avoid unnecessary repetition, various possible combinations of various specific technical features/embodiments are not described separately in the present disclosure.

Figure 1:
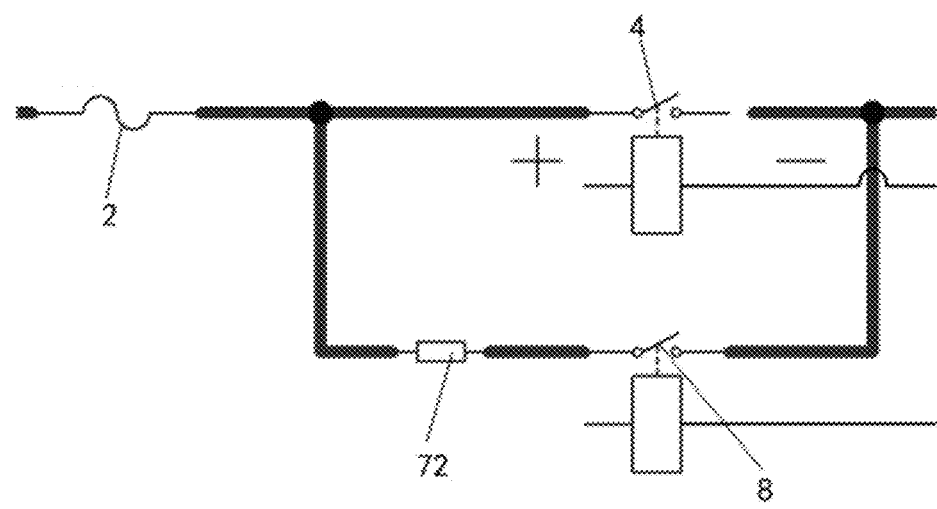
FIG. 1 is a schematic diagram of a principle of a power distribution device according to an embodiment of the present disclosure.
Figure 2:
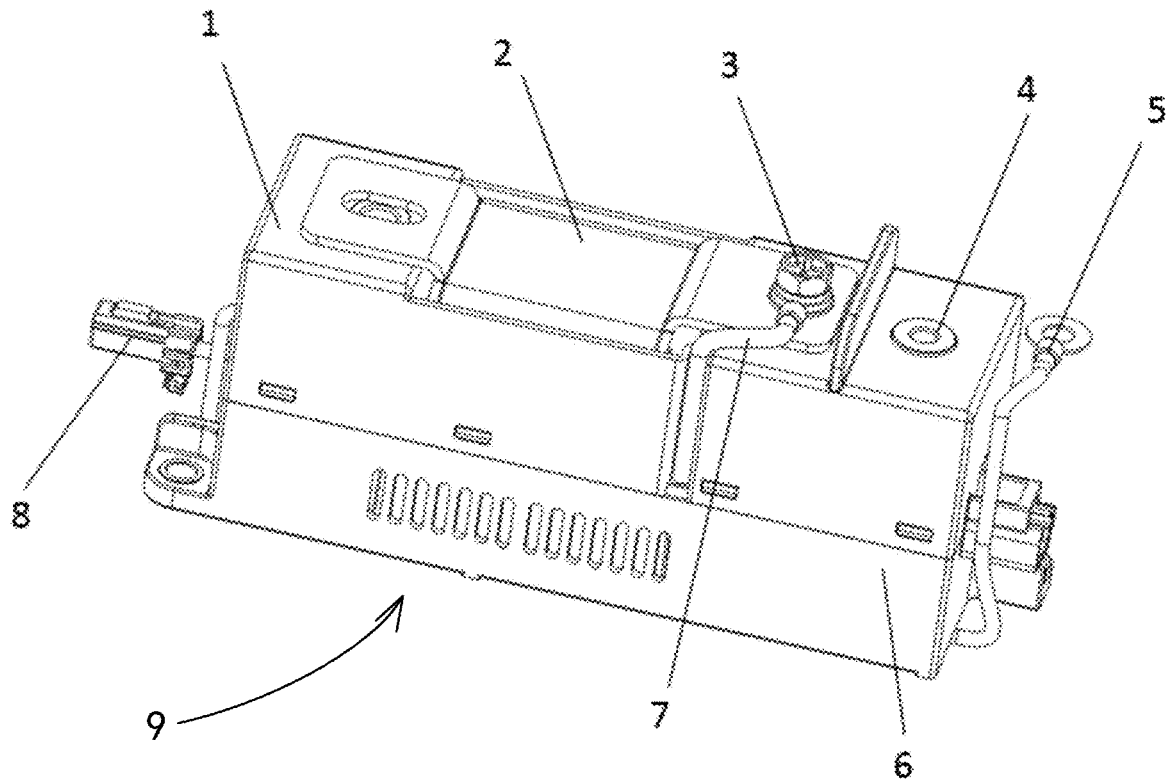
FIG. 2 is a schematic three-dimensional assembly diagram of a power distribution device according to an embodiment of the present disclosure.
Figure 3:
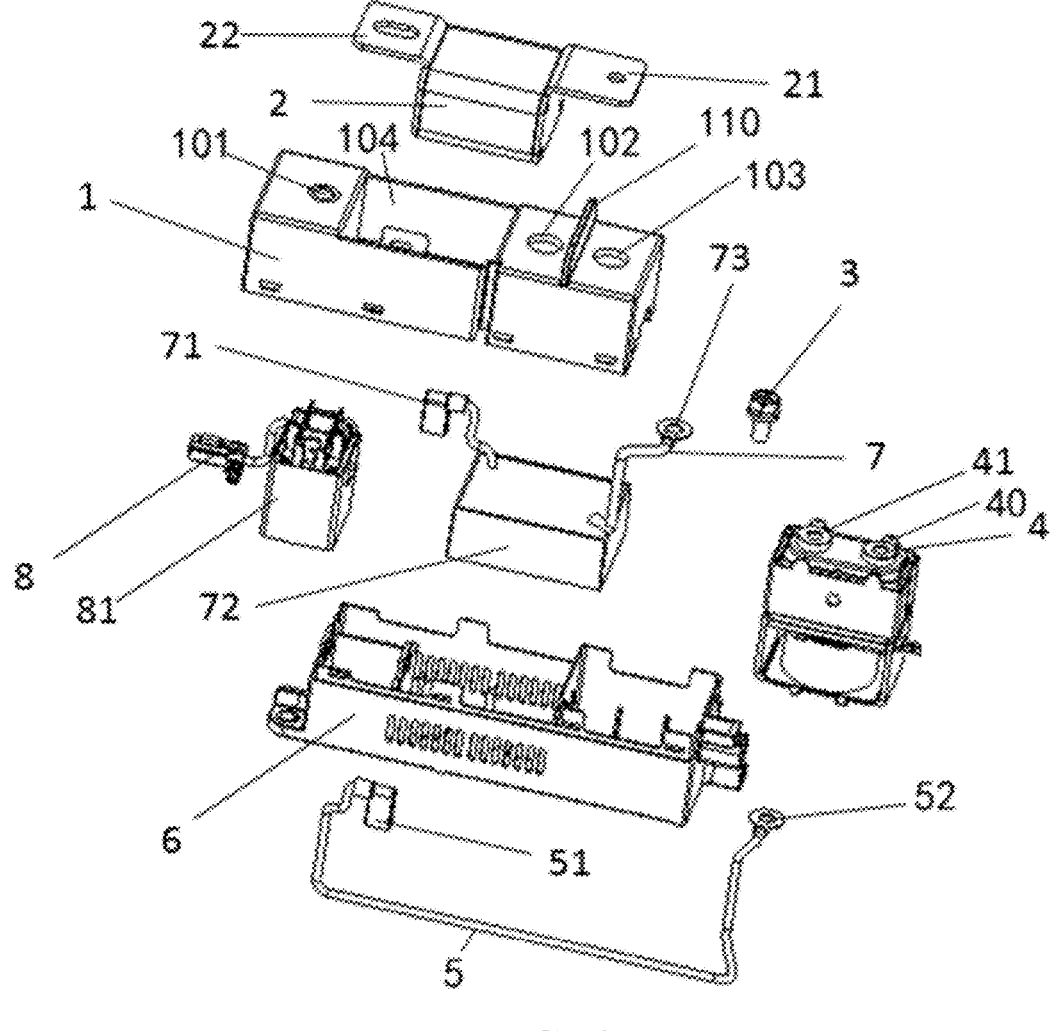
FIG. 3 is a schematic three-dimensional exploded view of a power distribution device according to an embodiment of the present disclosure.
Figure 4:
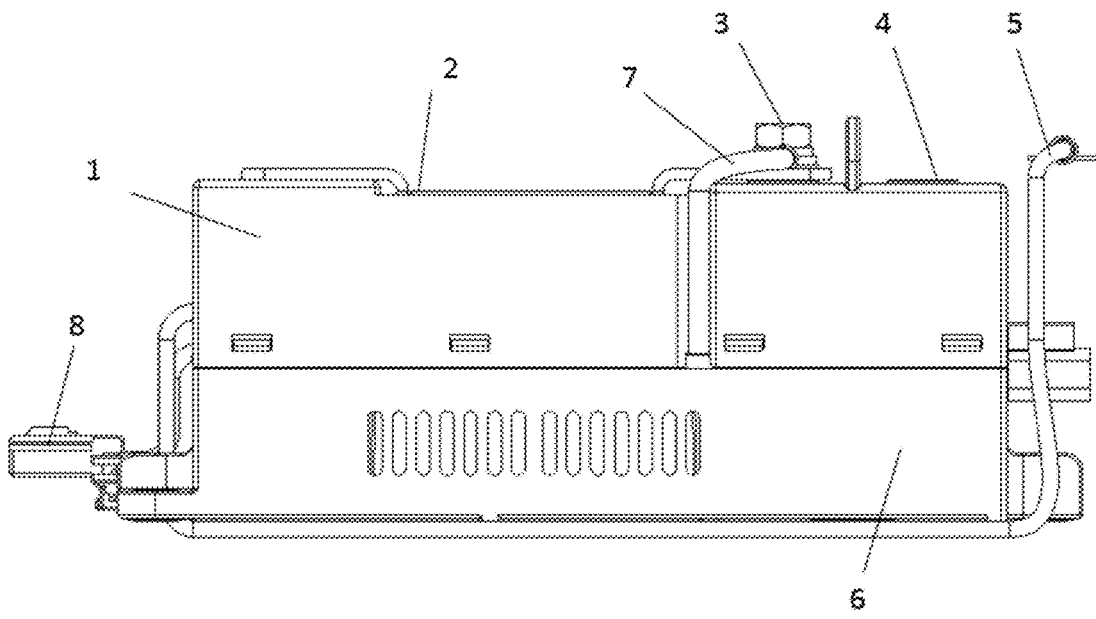
FIG. 4 is a schematic plane view of a power distribution device according to an embodiment of the present disclosure.
Figure 5:
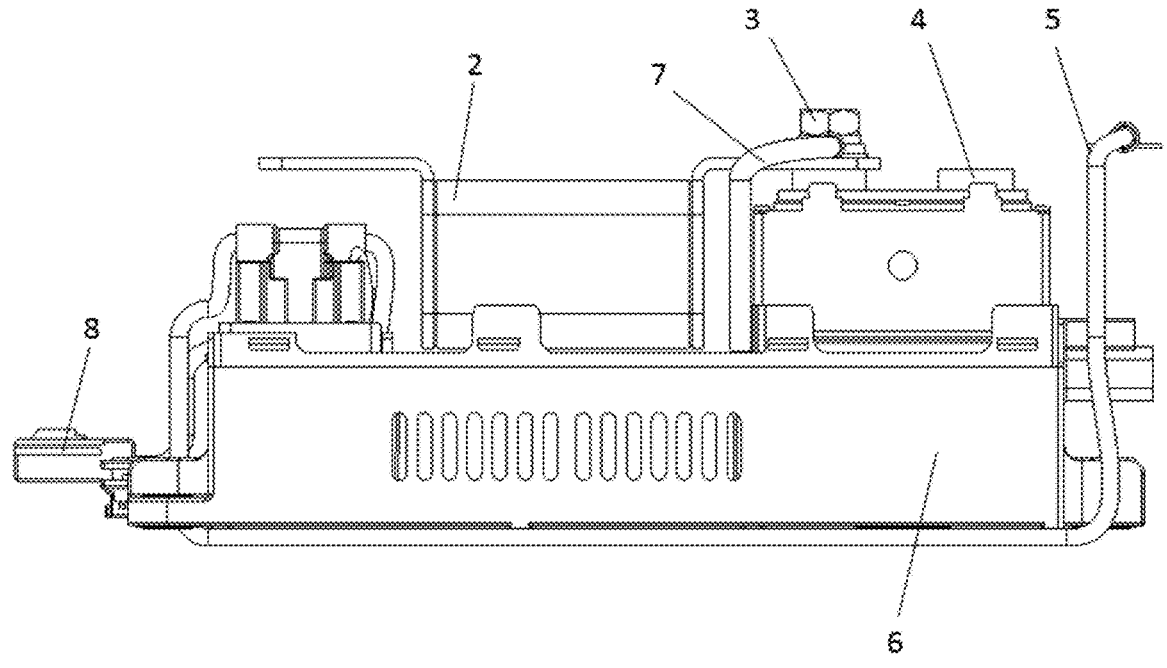
FIG. 5 is a schematic plane view of a power distribution device according to an embodiment of the present disclosure with an upper cover being removed.
Figure 6:
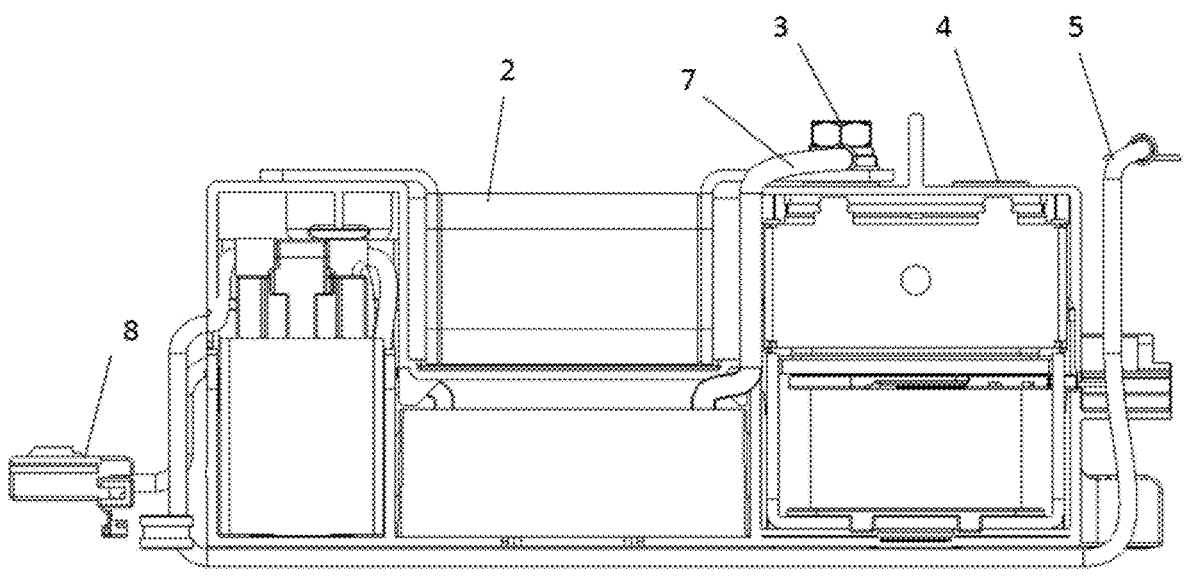
FIG. 6 is a schematic plane view of a power distribution device according to an embodiment of the present disclosure with an upper cover and a bottom shell being removed.

As shown in FIG. 1 to FIG. 6, an embodiment of the present disclosure provides a power distribution device. The power distribution device includes a housing 9, a pre-charging circuit module, and a main positive circuit module. The housing 9 has a mounting cavity. The pre-charging circuit module is configured to pre-charge a capacitor element in an electrical appliance, and includes a pre-charging relay 8. The pre-charging relay is connected with the housing 9. The main positive circuit module is configured to be closed after the pre-charging circuit module is opened, and the main positive circuit module and the pre-charging circuit module are stacked in the mounting cavity in an up-down direction. The main positive circuit module includes a fuse 2 and a main relay core 4, and the main relay core 4 is connected with the housing 9. The power distribution device has an input terminal and a first output terminal. A first end 22 of the fuse 2 is the input terminal or connected with the input terminal, a second end 21 of the fuse 2 is connected with a first end 41 of the main relay core 4, and a second end 40 of the main relay core 4 is the first output terminal or connected with the first output terminal. A first end of the pre-charging circuit module is connected with the input terminal or the second end 21 of the fuse 2, and a second end of the pre-charging circuit module is connected with the second end 40 of the main relay core 4 or the first output terminal. In this embodiment, the main relay core 4 is a semi-finished relay without shell at least, that is, the main relay is no longer mounted and used according to the finished product, but used with the semi-finished product (core). Structures of various components in the power distribution device are cooperatively and interactively designed, and the main positive circuit module and the pre-charging circuit module are arranged on the housing 9 in a local or overall stacking mode. In this way, the utilization rate of the internal space of the power distribution device is high, and the components do not affect each other, so that the damaged components can be replaced independently, which is beneficial to improving the product qualification rate and reducing the after-sales loss of the products, and the application cost is low. The power distribution device provided in this embodiment of the present disclosure is a controller or a component for connection and disconnection between an electric energy storage element (such as a battery module) and an electrical appliance, and is mainly applicable to control places where a loop generates a great current during power-on and power-off, such as an electric car, an electric ship, an electric rail transit, or an airplane. During normal use of the power distribution device, the pre-charging relay 8 is first closed to charge the capacitor element in the electrical appliance product, and the resistor in the pre-charging circuit module limits the current within a reasonable range. After the pre-charging is completed, the main relay core 4 is closed and the pre-charging relay 8 is opened, thereby completing the power-on process and continuing the power supply. When the electrical appliance is short-circuited, the fuse 2 can be passively forced to fuse and disconnect the electrical appliance from the power supply to protect the internal components of the electrical appliance from damage.

In an embodiment, the pre-charging circuit module further includes a pre-charging resistor 72. In this embodiment, the pre-charging resistor 72 is a wire-wound resistor. The pre-charging relay 8 and the main relay core 4 are respectively seated to two ends of the mounting cavity, and the fuse 2 and the pre-charging resistor 72 are arranged between the pre-charging relay 8 and the main relay core 4. The fuse 2 and the pre-charging resistor 72 may be close to the pre-charging relay 8 and the main relay core 4, and the pre-charging resistor 72 is seated to a bottom of the mounting cavity. The fuse 2 is located above the pre-charging resistor 72 and has a reasonable and compact structure with a high space utilization rate.

In an embodiment, the housing 9 includes a bottom shell 6 and a surface cover 1. The surface cover 1 may be connected with the bottom shell 6 through a snap-fit structure or a locking member to form the mounting cavity, and the pre-charging relay 8 may be connected with the bottom shell 6 through the clamping structure, so that the assembly efficiency is high. The main relay core 4 may be connected with the bottom shell 6 through a potting structure (potting adhesive is solidified), so that the heat dissipation performance is improved and the product reliability is high.

In an embodiment, an upper part of the surface cover 1 corresponding to the pre-charging relay 8 is provided with a first mounting hole 101, and an upper part of the surface cover 1 corresponding to the main relay core 4 is provided with a second mounting hole 102 and a third mounting hole 103. The first end 41 and the second end of the main relay core 4 are respectively located below the second mounting hole 102 and the third mounting hole 103. The surface cover 1 is provided with a mounting window 104 for the fuse 2 to be placed, and the fuse 2 may be seated to the mounting window 104 from top to bottom, so that the fuse 2 can be replaced without disassembling the surface cover 1, which is convenient for maintenance. However, the fuse 2 needs to be replaced after being blown when the circuit is short-circuited, etc. The above design can effectively shorten the man-hours required for maintenance and can improve the maintenance efficiency. The pre-charging relay 8 is located below the first mounting hole 101. The first end 22 of the fuse 2 extends to a position above the first mounting hole 101, and the second end 21 of the fuse 2 extends to a position above the second mounting hole 102. The first end 41 of the main relay core 4 is located below the second mounting hole 102, the second end 40 of the main relay core 4 is located below the third mounting hole 103, and the second end 21 of the fuse 2 is connected with the first end 41 of the main relay core 4 through a first locking member 3 passing through the second mounting hole 102. The first locking member 3 may be a bolt, and structural members such as copper bars are not needed, so that the structure is simple and compact and the reliability is desirable.

In an embodiment, the power distribution device further has a second output terminal, and includes a connecting wire harness 5. A first end 51 of the connecting wire harness 5 is inserted into the pre-charging relay 8 through a first connecting terminal (an insert terminal), so that the assembly and maintenance are convenient. A second end 52 of the connecting wire harness 5 may be the second output terminal, and the second end 52 of the connecting wire harness 5 may be a connecting copper bar terminal.

In an embodiment, the first end 71 of the pre-charging resistor 72 is inserted into a body 81 of the pre-charging relay 8 through the second connecting terminal (an insert terminal), so that the assembly and maintenance are convenient. A resistor wire harness 7 is connected between the second end 73 of the pre-charging resistor 72 and the pre-charging resistor 72. The housing 9 is provided with a wire slot for accommodating the resistor wire harness 7. The second end 73 of the pre-charging resistor 72 is arranged above the second end 21 of the fuse 2, and the first locking member 3 (bolt) may pass through the second end 73 of the pre-charging resistor 72 and the second end 21 of the fuse 2 and be connected with the first end 41 of the main relay core 4.

In an embodiment, the first end 22 of the fuse 2 is the input terminal and is provided with a first hole for a fastening screw to pass through. The first output terminal is provided with a second hole for a fastening screw to pass through. The input terminal may be connected with a battery through the fastening screw, and the first output terminal may be connected with the electrical appliance through the fastening screw, so that the connection reliability is desirable.

In an embodiment, an upper end of the surface cover 1 is provided with a baffle 110, and the second mounting hole 102 and the third mounting hole 103 are respectively located on two sides of the baffle 110, thereby achieving better safety and reliability. The upper end of the surface cover 1 is a part of the housing 9 opposite to the bottom shell 6.

In an embodiment, the bottom shell 6 is provided with an elastic sheet configured to abut against a side surface of the pre-charging resistor 72, and the surface cover 1 is provided with a positioning rib configured to abut against an end surface of the pre-charging resistor 72. The limiting structure, the clamping structure, and the upper cover are mated with each other for limiting and fixation, and components such as screws are not needed, so that the assembly efficiency is high and the material management cost is low.

The present disclosure further provides a transportation device. The transportation device has the power distribution device, and the transportation device may be an electric vehicle, an electric ship, an electric rail transit, an airplane, or the like.

For the assembly process of the power distribution device provided in an embodiment of the present disclosure, reference may be made to the following.

The main relay core 4 is placed at one end in the bottom shell 6, and the main relay core 4 is fixed to the bottom shell 6 by potting adhesive.

The body 81 of the pre-charging relay 8 is placed at the other end in the bottom shell 6, and the pre-charging relay 8 is fixed to the bottom shell 6 through a snap-fit structure.

The first end 51 of the connecting wire harness 5 is connected with the body 81 of the pre-charging relay 8 through an insert terminal.

A pre-charging resistor 72 (wire-wound resistor) is placed in the bottom shell 6, and the pre-charging resistor 72 is located between the main relay core 4 and the body 81 of the pre-charging relay 8. The first end 71 of the pre-charging resistor 72 is connected with the body 81 of the pre-charging relay 8 through the insert terminal, the resistor wire harness 7 is placed into the wire slot, and then the pre-charging resistor 72 (wire-wound resistor) is fixed to the elastic sheet of the bottom shell 6 through the positioning rib of the upper cover.

The upper cover and the bottom shell 6 are mounted and fixed by a snap.

The fuse 2 is placed in the mounting window 104 of the upper cover, the first end 22 of the fuse 2 is located in the first mounting hole 101, the second end 21 of the fuse 2 is located in the second mounting hole 102, and the second end 73 of the pre-charging resistor 72 is placed on the second end 21 of the fuse 2 and is connected with the first end 41 of the main relay core 4 by using the first locking member 3 (screw).

Figure 7:
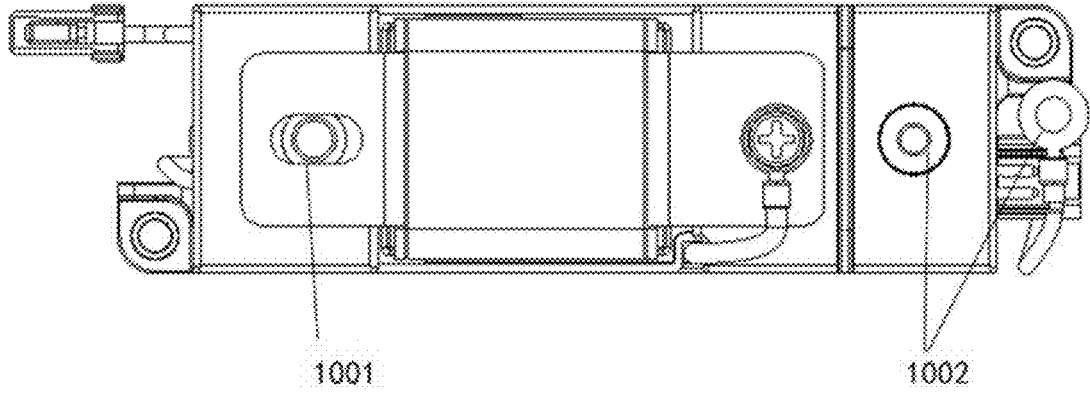
FIG. 7 is another schematic plane view of a power distribution device according to an embodiment of the present disclosure.

During the operation of the power distribution device, for the current trend, reference may be made to the following description (in this embodiment, the input terminal is a current input terminal 1001, and the first output terminal and the second output terminal are the current output terminal 1002, as shown in FIG. 1 to FIG. 7).

I. Pre-power-on process: An external control system determines the start of pre-power-on. An input voltage of the pre-charging relay 8 enters the body 81 of the pre-charging relay 8, and the pre-charging relay 8 starts operating. First, an input current enters the fuse 2 from the first end 22 of the fuse 2, enters the pre-charging resistor 72 through a joint of the second end 21 of the fuse 2 and the second end 73 of the pre-charging resistor 72, then enters the pre-charging relay 8 through a joint of the first end 71 of the pre-charging resistor 72 and the pre-charging relay 8, finally flows out to the connecting wire harness 5 through a joint of the pre-charging relay 8 and the first end 51 of the connecting wire harness 5, and finally flows out from the connecting wire harness 5.

II. Pre-power-on and power-off process: After the external control system determines that the pre-power-on is completed, the input voltage of the main relay core 4 enters the main relay core 4, the main relay core 4 starts operating, the pre-charging relay 8 stops operating, and the current stops at the pre-charging resistor 72.

III. Discharge process: The main relay core 4 starts operating. After pre-power-on and power-off (power-off of the pre-charging circuit module), the current enters the fuse 2 from the first end 22 of the fuse 2, enters the main relay core 4 through a joint of the second end 21 of the fuse 2 and the first end 41 of the main relay core 4, and finally flows out from the main relay core 4.

The core component of the main relay is selected as the power distribution device and the transportation device having the power distribution device provided in the embodiments of the present disclosure, instead of the finished product of the conventional main relay. That is, the main relay core 4 is selected, and the housing of the conventional relay product itself is removed. The mounting space required for the relay is reduced, the potting structure is adopted for mounting, and a mounting and fixation point for mounting the conventional relay is removed, thereby saving the mounting space and product cost.

In addition, fastening screw mounting pins of the conventional pre-charging relay 8 product itself are further canceled, and the mounting space required is reduced. Instead, the pre-charging relay 8 and the bottom shell 6 are mounted together by snaps, which saves the mounting space and product cost. Moreover, unlike the conventional manner of side-by-side arrangement, the main positive circuit module and the pre-charging circuit module are stacked with the former atop the latter, and are coordinatedly arranged in the housing, which makes full use of the redundant space within the module. The pre-charging resistor 72 is fixed by using the positioning rib of the upper cover and the elastic sheet of the bottom shell 6. The fastening screw mounting pins of the conventional pre-charging resistor 72 are removed, which further saves the mounting space and product cost. In addition, the fuse 2 and the main relay core 4 are locked with the second end 21 of the fuse 2 and the first end 41 of the main relay core 4 through fastening screws, so that the conventional connecting copper bar transfer mode is canceled, which is also beneficial to saving the mounting space and product cost, and the utilization rate of the internal space of the power distribution device is high. Moreover, no mutual influence exists between components, and the damaged components can be replaced separately, which is beneficial to increasing the product qualification rate and reducing the after-sales loss of products, and the application cost is low.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A power distribution device, comprising:
a housing, having a mounting cavity;
a pre-charging circuit module, configured to pre-charge a capacitor element in an electrical appliance and comprising a pre-charging relay, the pre-charging relay being connected with the housing; and
a main positive circuit module, configured to be closed after the pre-charging circuit module is opened, the main positive circuit module and the pre-charging circuit module being stacked in the mounting cavity in an up-down direction, the main positive circuit module comprising a fuse and a main relay core, and the main relay core being connected with the housing;
the power distribution device having an input terminal and a first output terminal, a first end of the fuse being the input terminal or connected with the input terminal, a second end of the fuse being connected with a first end of the main relay core, a second end of the main relay core being the first output terminal or connected with the first output terminal, a first end of the pre-charging circuit module being connected with the input terminal or the second end of the fuse, and a second end of the pre-charging circuit module being connected with the second end of the main relay core or the first output terminal,
wherein the housing comprises a bottom shell and a surface cover; the surface cover is connected with the bottom shell through a snap-fit structure or a locking member to form the mounting cavity; the pre-charging relay is connected with the bottom shell through the clamping structure; and the main relay core is connected with the bottom shell through the potting structure, and
wherein the surface cover is provided with a first mounting hole corresponding to an upper part of the pre-charging relay; the surface cover is provided with a second mounting hole and a third mounting hole corresponding to an upper part of the main relay core; the surface cover is provided with a mounting window for the fuse to be placed; the pre-charging relay is located below the first mounting hole; a first end of the fuse extends to a position above the first mounting hole; the second end of the fuse extends to a position above the second mounting hole; the first end of the main relay core is located below the second mounting hole; the second end of the main relay core is located below the third mounting hole; and the second end of the fuse is connected with the first end of the main relay core through a first locking member passing through the second mounting hole.

2. The power distribution device according to claim 1, wherein the pre-charging circuit module further comprises a pre-charging resistor; the pre-charging relay and the main relay core are respectively seated to two ends of the mounting cavity; the fuse and the pre-charging resistor are arranged between the pre-charging relay and the main relay core; the pre-charging resistor is seated to a bottom of the mounting cavity; and the fuse is located above the pre-charging resistor.

3. The power distribution device according to claim 2, wherein the fuse and the pre-charging resistor are close to the pre-charging relay and the main relay core.

4. The power distribution device according to claim 1, wherein the pre-charging relay is connected with the housing through a clamping structure or a potting structure; and the main relay core is connected with the housing through a potting structure or a clamping structure.

5. The power distribution device according to claim 4, wherein the potting structure is formed through solidification of potting adhesive.

6. The power distribution device according to claim 1, further having a second output terminal, and comprising a connecting wire harness, a first end of the connecting wire harness being inserted into the pre-charging relay through a first connecting terminal, and a second end of the connecting wire harness being the second output terminal.

7. The power distribution device according to claim 6, wherein the second end of the connecting wire harness is a connecting copper bar terminal.

8. The power distribution device according to claim 6, wherein the first connecting terminal is an insert terminal.

9. The power distribution device according to claim 6, wherein the input terminal is a current input terminal; and the first output terminal and the second output terminal are current output terminals.

10. A power distribution device, comprising:

a housing, having a mounting cavity;

a pre-charging circuit module, configured to pre-charge a capacitor element in an electrical appliance and comprising a pre-charging relay, the pre-charging relay being connected with the housing; and a main positive circuit module, configured to be closed after the pre-charging circuit module is opened, the main positive circuit module and the pre-charging circuit module being stacked in the mounting cavity in an up-down direction, the main positive circuit module comprising a fuse and a main relay core, and the main relay core being connected with the housing;

the power distribution device having an input terminal and a first output terminal, a first end of the fuse being the input terminal or connected with the input terminal, a second end of the fuse being connected with a first end of the main relay core, a second end of the main relay core being the first output terminal or connected with the first output terminal, a first end of the pre-charging circuit module being connected with the input terminal or the second end of the fuse, and a second end of the pre-charging circuit module being connected with the second end of the main relay core or the first output terminal, wherein the pre-charging circuit module further comprises a pre-charging resistor; the pre-charging relay and the main relay core are respectively seated to two ends of the mounting cavity; the fuse and the pre-charging resistor are arranged between the pre-charging relay and the main relay core; the pre-charging resistor is seated to a bottom of the mounting cavity; and the fuse is located above the pre-charging resistor, and wherein a first end of the pre-charging resistor is inserted into the pre-charging relay through a second connecting terminal; a resistor wire harness is connected with a second end of the pre-charging resistor; the housing is provided with a wire slot for accommodating the resistor wire harness; and the second end of the pre-charging resistor is arranged above the second end of the fuse.

11. The power distribution device according to claim 10, wherein the first end of the pre-charging resistor is inserted into a body of the pre-charging relay through the second connecting terminal.

12. The power distribution device according to claim 10, wherein the second connecting terminal is an insert terminal.

13. The power distribution device according to claim 1, wherein the first end of the fuse is the input terminal and is provided with a first hole for a fastening screw to pass through; and the first output terminal is provided with a second hole for a fastening screw to pass through.

14. The power distribution device according to claim 13, wherein the input terminal is connected with a battery through the fastening screw; and the first output terminal is connected with the electrical appliance through the fastening screw.

15. The power distribution device according to claim 1, wherein an upper end of the surface cover is provided with a baffle; and the second mounting hole and the third mounting hole are respectively located on two sides of the baffle.

16. A power distribution device, comprising:

a housing, having a mounting cavity;

a pre-charging circuit module, configured to pre-charge a capacitor element in an electrical appliance and comprising a pre-charging relay, the pre-charging relay being connected with the housing; and a main positive circuit module, configured to be closed after the pre-charging circuit module is opened, the main positive circuit module and the pre-charging circuit module being stacked in the mounting cavity in an up-down direction, the main positive circuit module comprising a fuse and a main relay core, and the main relay core being connected with the housing;

the power distribution device having an input terminal and a first output terminal, a first end of the fuse being the input terminal or connected with the input terminal, a second end of the fuse being connected with a first end of the main relay core, a second end of the main relay core being the first output terminal or connected with the first output terminal, a first end of the pre-charging circuit module being connected with the input terminal or the second end of the fuse, and a second end of the pre-charging circuit module being connected with the second end of the main relay core or the first output terminal, wherein the housing comprises a bottom shell and a surface cover; the surface cover is connected with the bottom shell through a snap-fit structure or a locking member to form the mounting cavity; the pre-charging relay is connected with the bottom shell through the clamping structure; and the main relay core is connected with the bottom shell through the potting structure, and wherein the bottom shell is provided with an elastic sheet configured to abut against a side surface of the pre-charging resistor; the surface cover is provided with a positioning rib configured to abut against an end surface of the pre-charging resistor; and the pre-charging resistor is a wire-wound resistor.

17. The power distribution device according to claim 1, wherein the main relay core is a relay without a housing.

18. A transportation device, comprising the power distribution device according to claim 1, further including:

an electric energy storage element; and an electrical appliance, the power distribution device being connected between the electric energy storage element and the electrical appliance, and being configured for connection and disconnection between an electric module and the electrical appliance.

* * * * *